(12) United States Patent
Tjandra et al.

(10) Patent No.: US 11,076,277 B2
(45) Date of Patent: Jul. 27, 2021

(54) PUBLIC SAFETY SYSTEMS AND METHODS FOR PROVIDING EMERGENCY ACCESS TO PRIVATE NETWORKS

(71) Applicant: Motorola Solutions, Inc., Chicago, IL (US)

(72) Inventors: Paula Tjandra, Inverness, IL (US); James M. Nowakowski, Buffalo Grove, IL (US); Jamillah G. Davis, Hoffman Estates, IL (US); Mark P. Zollner, Palatine, IL (US); Yen Hsiang Chew, Bayan Lepas (MY)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 16/237,217

(22) Filed: Dec. 31, 2018

(65) Prior Publication Data
US 2020/0213831 A1 Jul. 2, 2020

(51) Int. Cl.
| | | |
|---|---|---|
| *H04W 4/00* | (2018.01) | |
| *H04W 4/90* | (2018.01) | |
| *H04W 76/50* | (2018.01) | |
| *H04W 4/10* | (2009.01) | |
| *H04W 12/08* | (2021.01) | |
| *H04W 12/30* | (2021.01) | |
| *H04W 12/06* | (2021.01) | |
| *H04W 84/12* | (2009.01) | |

(52) U.S. Cl.
CPC .............. *H04W 4/90* (2018.02); *H04W 4/10* (2013.01); *H04W 12/068* (2021.01); *H04W 12/08* (2013.01); *H04W 12/35* (2021.01); *H04W 76/50* (2018.02); *H04W 84/12* (2013.01)

(58) Field of Classification Search
CPC ... H04W 4/90; H04W 76/50; H04W 12/0608; H04W 12/0023; H04W 4/10; H04W 12/08; H04W 84/12
See application file for complete search history.

(56) References Cited

U.S. PATENT DOCUMENTS

| | | |
|---|---|---|
| 5,511,232 A | 4/1996 | O'Dea et al. |
| 8,116,327 B2 | 2/2012 | Schuette et al. |
| (Continued) | | |

OTHER PUBLICATIONS

International Search report and Written Opinion of International application No. PCT/US2019/067395, dated Mar. 31, 2020, 14 pages, Mar. 31, 2020.

*Primary Examiner* — Pakee Fang
(74) *Attorney, Agent, or Firm* — Baker Botts L.L.P.

(57) ABSTRACT

Disclosed herein are public safety systems and methods for providing private network access to a user device. An exemplary public safety system is configured to communicate with a plurality of private networks and a communications network. The exemplary public safety system is configured to receive an emergency notification identifying a first private network of the plurality of private networks. The exemplary public safety system is configured to select the first private network. The exemplary public safety system is configured to provision the first private network to accept a configuration credential. The exemplary public safety system is configured to send through the communications network the configuration credential to a user device, thereby provisioning a subscriber identification module (SIM) in the user device to access the first private network.

15 Claims, 2 Drawing Sheets

(56) References Cited

U.S. PATENT DOCUMENTS

| | | | |
|---|---|---|---|
| 9,226,124 B2 | 12/2015 | Schuler et al. | |
| 2003/0069002 A1* | 4/2003 | Hunter | G09F 27/00 |
| | | | 455/404.2 |
| 2004/0266449 A1* | 12/2004 | Smetters | H04W 12/04 |
| | | | 455/452.1 |
| 2012/0269099 A1* | 10/2012 | Chin | H04L 65/1016 |
| | | | 370/259 |
| 2014/0373124 A1* | 12/2014 | Rubin | H04W 72/10 |
| | | | 726/7 |
| 2016/0088463 A1 | 3/2016 | Stanke et al. | |
| 2016/0234828 A1* | 8/2016 | Smith | H04W 4/21 |
| 2016/0344747 A1* | 11/2016 | Link, II | H04L 63/123 |
| 2017/0238136 A1* | 8/2017 | Smith | H04M 1/72421 |
| | | | 455/456.3 |
| 2017/0366976 A1 | 12/2017 | Mazzarella et al. | |
| 2017/0374557 A1* | 12/2017 | Mueck | H04W 16/14 |

\* cited by examiner

PUBLIC SAFETY SYSTEMS AND METHODS FOR PROVIDING EMERGENCY ACCESS TO PRIVATE NETWORKS

BACKGROUND OF THE INVENTION

Facilities can have one or more private networks. The private networks may be generally closed to users unless the users are subscribed to the private networks. In emergency situations, the private networks of one or more facilities may be closed to first responders, although the private networks have access to information and network access that can aid the first responders in addressing the emergency.

SUMMARY

In some situations, it may be useful to permit a user to access any one or more private networks of facilities. For example, in the case of an emergency at a facility, it can be useful to provide a first responder with access to the private network of the facility. By using the private network, the first responder may, for example, view security footage, unlock closed doors, access push-to-talk (PTT) service and alert users of the private network who are tenants of the facility.

Disclosed herein are public safety systems and methods that provide access to private networks. Some exemplary public safety systems may use one network to provide a user access to another network, such as a private CBRS network. The public safety systems and methods allow for remote granting of a credential for access, such that a user device can be configured to access a private network without manual intervention by the user. For example, the user need not physically replace a subscriber identity module (SIM) card to gain access to a private network.

In some exemplary public safety systems, the public safety system may be configured to communicate with a plurality of private networks and a communications network. The communications network can be, for example a fourth generation broadband wireless technology (4G) network, an LMR network, long-term evolution wireless technology (LTE) network, Wi-Fi network, a fifth generation broadband wireless technology (5G) network, or any other suitable network. The public safety system may provision one or more of the plurality of private networks to accept a user device. As the user device may be communicatively coupled to the communications network, the public safety system may provision the user device to access the one or more of the plurality of networks by communicating with the user device through the communications network.

To provide a user access to one or more private networks during an emergency, it may be useful for the public safety system to recognize when an emergency exists. Accordingly, in some exemplary public safety systems, the public safety system may be configured to receive an emergency notification identifying a first private network of the plurality of private networks. To provide the user with access to the private network associated with the emergency, some exemplary public safety systems are configured to select the first private network of the plurality of private networks.

To allow the first plurality of private networks to accept communication from a user device, some exemplary public safety systems are configured to provision the first private network to accept a configuration credential. The configuration credential may act as a key to the private network such that a user device having the configuration credential may access the private network. In some exemplary public safety systems, the configuration credential may include at least one of a Citizens Broadband Radio Service (CBRS) operating frequency band identifier, an on-premises network operator international mobile subscriber identity (IMSI), a temporary mobile subscriber identity (TMSI), an authentication key, a closed subscriber group (CSG) information, access point name (APN) information, and a location area identity (LAI).

To provision a user device to access the first private network, an exemplary public safety system is configured to communicate with a communications network. The public safety system may send through the communications network the configuration credential to a user device, thereby provisioning an electronic or physical subscriber identification module in the user device to access the first private network.

In some public safety systems, one or more of the plurality of private networks may be Citizens Broadband Radio Service (CBRS) networks. Additionally or alternatively, one or more of the plurality of private networks is an on-premise private network. Additionally or alternatively, one or more of the plurality of private networks may have read and write access to a database of facility information. In some exemplary public safety systems, the database of facility information may include at least one of a smoke information, a gas information, a map information, a security footage, a temperature information, a light control information, an elevator access information, and a door access information.

It may also be desirable to alert users of one or more private networks that an emergency is occurring. In some exemplary public safety systems, the public safety system is configured to provide an alert through the first private network upon receiving the emergency notification. In some cases, it may be desirable to alert only those in danger of the emergency. Accordingly, in some exemplary public safety systems, an alert may be targeted to only some of a plurality of devices communicatively coupled to the first private network.

Disclosed herein are methods for providing private network access to a user device. Some exemplary methods may use one network, such as an LMR network, a LTE network, a Wi-Fi network (and so on) to provide a user access to another network, such as a private CBRS network. Some exemplary methods include receiving an emergency notification identifying at least one private network of a plurality of private networks.

Some exemplary methods include selecting the first private network. Selecting the first private network allows for the method to choose which network is needed to be accessed by the user device. The first private network may be any kind of appropriate network for data transfer, including, for example, a CBRS network. The first private network may additionally or alternatively be an on-premise network.

To allow a user device to access the first private network, some exemplary methods include provisioning the first private network to accept a configuration credential. The configuration credential may include one or more of a Citizens Broadband Radio Service (CBRS) operating frequency band, an on-premises network operator international mobile subscriber identity (IMSI), a temporary mobile subscriber identity (TMSI), an authentication key, a closed subscriber group (CSG) information, access point name (APN) information, and a location area identity (LAI).

Some exemplary methods include sending, via one communications network the configuration credential to the user device, thereby provisioning a subscriber identification module (SIM) in the user device to access the first private network. The SIM can be a physical SIM or an electronic SIM The communications network can be, for example a fourth generation broadband wireless technology (4G) network, an LMR network, long-term evolution wireless technology (LTE) network, Wi-Fi network, a fifth generation broadband wireless technology (5G) network, or any other suitable network. Use of the communications network allows for remote provisioning of a user device, such that the user device may be provisioned with the configuration credential to access the network while, for example, the user is en route to an emergency destination. In some exemplary methods, the first private network is configured to accept the configuration credential.

In some exemplary methods, the private network may have read and write access to a database of facility information. Once the user device has access to the first private network, it may be useful to read from the database of facility information to view, for example, security footage. Accordingly, some exemplary methods include reading from the database of facility information. The database of facility information may include one or more of a smoke information, a gas information, a map information, a security footage, a temperature information, a light control information, an elevator access information, and a door access information.

It may also be desirable to alert users of the private network about the emergency. For example, it may be useful to inform tenants of a facility not to go to a certain floor or to remain in or evacuate their respective units. Accordingly, some exemplary methods include providing an alert through the private network. In some cases, not all users of the network need to receive the alert. Accordingly, the alert may be targeted to only some of a plurality of devices communicatively coupled to the first private network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
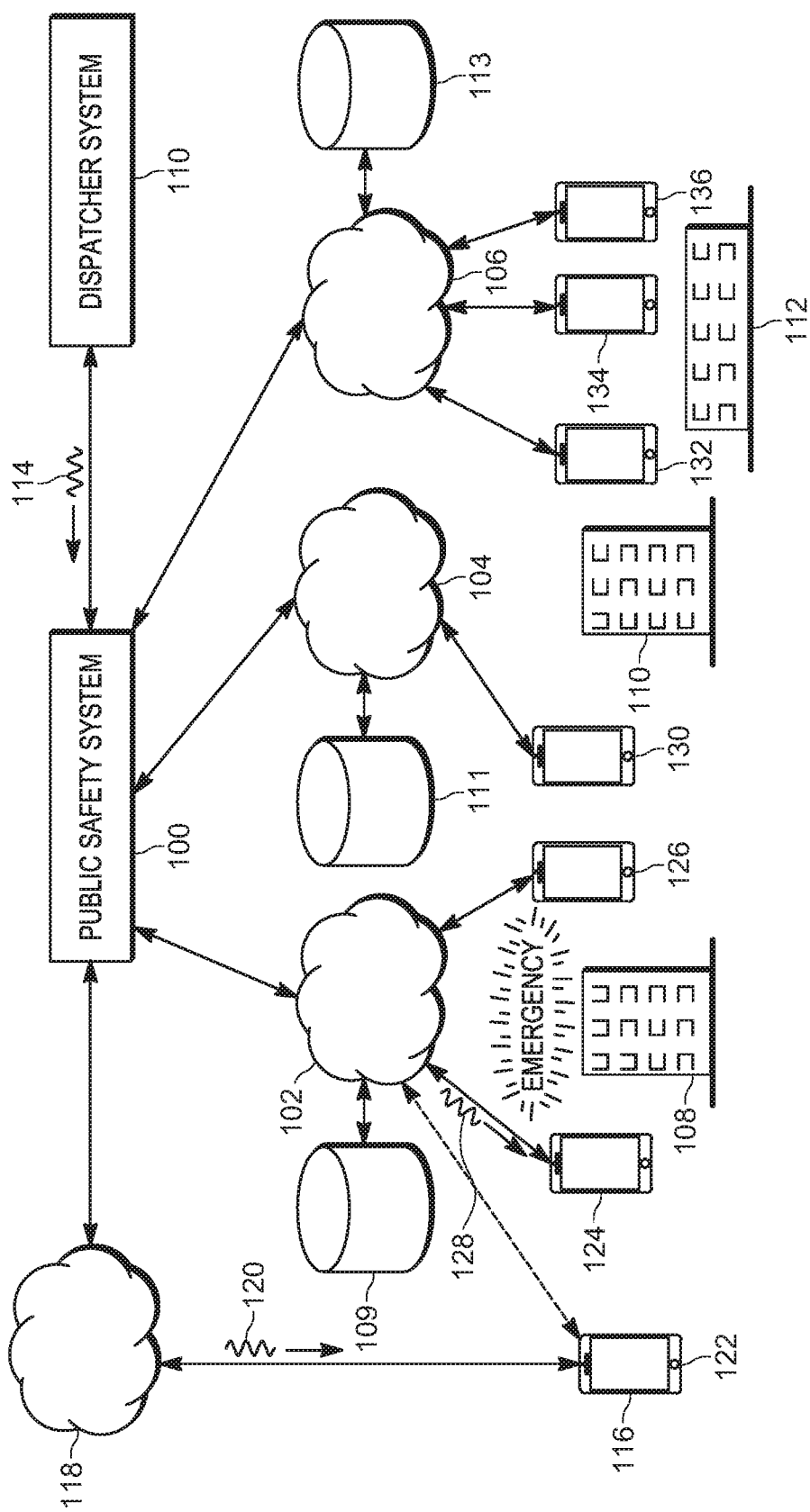
FIG. 1 is a schematic diagram of a public safety system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems and methods that provide access to private networks. Private networks may exist for certain facilities and contain information about the facilities. For example, the facilities may contain security footage, smoke alarm information, maps, identification of what doors are locked, locations of tenants, door access information, and so on. Such information may generally be desired to be private, for example, by tenants of an apartment building utilizing the private network. However, in emergency situations, it may be desired to give such information to first responders. For example, a firefighter may use smoke alarm information, security footage, and other information to determine whether any people occupy a building on fire and where those people or the fire are located. Additionally, the first responders may need the ability to use the private networks to, for example, unlock doors to aid people behind the doors.

FIG. 1 shows an exemplary public safety system 100. The public safety system 100 may include a computer-readable storage medium having computer readable code stored thereon for programming a computer (e.g., including a processor). The public safety system is configured to communicate with a private network 102, a private network 104, and a private network 106. The private networks 102 through 106 may be wireless networks and may operate under any number of standards, such as fourth generation broadband wireless technology (4G), LMR technology, long-term evolution wireless technology (LTE), Wi-Fi, and fifth generation broadband wireless technology (5G). The private networks 102 through 106 may additionally or alternatively be on-premise networks, meaning that the private networks 102 through 106 are accessible by a user device only when the user device is within a distance of a point of relevance (for example, near a facility corresponding to the network). The private networks 102 through 106 may operate on any appropriate frequency spectrum. For example, any one or more of the private networks 102 through 106 may operate on a Citizens Broadband Radio Service (CBRS) frequency spectrum. The private networks 102 through 106 each correspond to a facility 108, a facility 110, and a facility 112, respectively. The private networks 102 through 106 each have respective read and write access to a database of facility information 109, a database of facility information 111, and a database of facility information 113. Each database of facility information 109 through 113, may contain a variety of information corresponding to the respective facilities 108 through 112, such as a smoke information, a gas information, a map information, a security footage, a temperature information, a light control information, an elevator access information, and a door access information. The information may be static or may be updated in real-time, providing historic or current information about the facility.

In an emergency, the public safety system 100 may receive an emergency notification 114 identifying one or more of the private networks 102 through 106. The emergency notification 114 may be sent by a dispatcher system 110 to the public safety system 100. The dispatcher system 110 may be alerted of an emergency, for example, by receiving a phone call from a user or by a notification from the private networks 102 through 106. The emergency notification 114 is electronic data and identifies which of the facilities 108 through 112 associated with the private networks 102 through 106 is experiencing an emergency. In this example, the facility 108 is experiencing an emergency, so the emergency notification 114 identifies the associated private network 102.

Upon receiving the emergency notification 114, it may be desired for the public safety system to provide a first responder with access to the private network 102 for the associated facility 108 experiencing the emergency. The first responder may have a user device 116. The user device 116 may be communicatively coupled to a communications network 118. The public safety system 100 may also be communicatively coupled to the communications network 118. To provide the first responder network access to one or more of the private networks 102 through 106, the public safety system 100 may be configured to select which of the one or more of the private networks 102 through 106 needs to be accessed. As the private network 102 is associated with the emergency, the public safety system 100 selects the private network 102. The communications network 118 can be, for example a fourth generation broadband wireless technology (4G) network, an LMR network, long-term evolution wireless technology (LTE) network, a Wi-Fi network, a fifth generation broadband wireless technology (5G) network, or any other suitable network.

Upon selecting the private network 102, the public safety system 100 may be operable to provision the private network 102 to accept a configuration credential 120. The public safety system 100 may then send the configuration credential 120 through the communications network 118 to the user device 116, thereby provisioning the user device 116 to access the first private network 102. The configuration credential 120 may provision the user device 116 for access by provisioning a subscriber identification module (SIM) 122 in the user device 116 to access the private network 102. The SIM 122 may be electronic or physical. The configuration credential 120 can be sent to the user device 116 by the public safety system 100 through the communications network 118. As the user device 116 may already be configured to communicate with the communications network 118, the public safety system 100 allows for remotely granting the first responder and the user device 116 remote access to one or more of the private networks 102 through 106. Examples of the configuration credential 120 include electronic data, including one or more of a Citizens Broadband Radio Service (CBRS) operating frequency band identifier, an on-premises network operator international mobile subscriber identity (IMSI), a temporary mobile subscriber identity (TMSI), an authentication key, a closed subscriber group (CSG) information, access point name (APN) information, and a location area identity (LAI).

Through the user device 116 and the private network 102, the first responder can obtain information about the facility 108 and also interact with the facility 108 by, for example, unlocking doors. Through the private network 102, the first responder may have network access to a number of applications including, for example, a push-to-talk (PTT) service, which could allow, for example, first responders to communicate in the facility 108 with other subscribers, such as tenants, to the private network 102. The PTT service may, for example, be accessed via internet access provided by the private network 102. The first responder may have access only to the private network 102 and the PTT service could allow the first responders to communicate with the tenants despite not having access to the communications network 118.

It may also be desirable to alert users of the private network 102 about the emergency. For example, it may be useful to inform all tenants of a facility, or targeted subgroups of tenants of the facility, not to go to a certain floor or to remain in or evacuate their respective units. These tenants or users may also have access to some or part of the private network 102. As users may have a user device 124 and a user device 126 communicatively coupled to the private network 102, the first responder or dispatcher, for example, can send an alert 128 through the public safety system 100 to the private network 102, and ultimately to one or more of the user devices 124 and 126. Sometimes it may be desirable to send an alert to less than every user device connected to a private network. For example, not all tenants in a large building need to be alerted to evacuate a building with a small fire on the top floor of the building. The alert 128 may be targeted to less than all of the user devices communicatively coupled to a network. As shown in FIG. 1, the alert 128 is sent only to the user device 124. The alert 128 can be any electronic data including text, sound, images, or a combination thereof. The first responder may use the PTT service to send the alert 128.

The public safety systems disclosed herein allow for first responders to access one of many private networks, to access information through the private network, and to alert users of those private networks. For example, the public safety system 100 could further be used to provision the private network 104, the private network 106, or both to accept a configuration credential. The private network could then provision the user device 116 to access the private network 104, the private network 106, or both. The public safety system 100 could then be used to alert a user device 130 communicatively coupled to the private network 104 and to alert a user device 132, a user device 134, and a user device 136 communicatively coupled to the private network 106.

Figure 2:
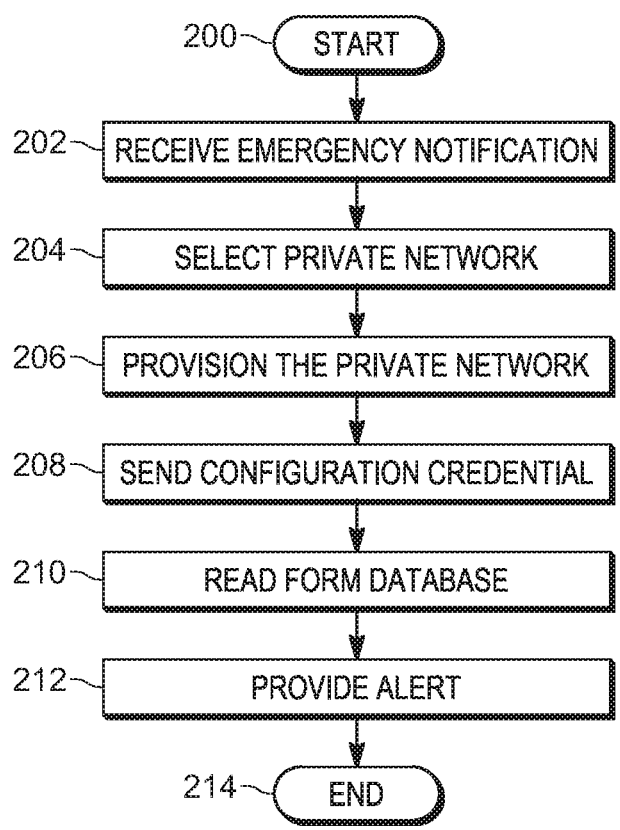
FIG. 2 is a flow chart of a method for providing private network access to a user device in accordance with some embodiments.

Disclosed herein are methods for providing private network access to a user device. Exemplary methods may use a communications network, such as an LMR network, to provide a user access to an additional network, such as a private CBRS network. The communications network, the additional network, or both can be, for example, a fourth generation broadband wireless technology (4G) network, an LMR network, long-term evolution wireless technology (LTE) network, Wi-Fi network, a fifth generation broadband wireless technology (5G) network, or any other suitable network. FIG. 2 depicts an exemplary method for providing private network access to a user device. The exemplary methods disclosed herein may be implemented with systems described herein. The exemplary method starts at step 200. At step 202, the exemplary method includes receiving an emergency notification. The emergency notification identifies which private network is associated with a facility that is experiencing an emergency.

At step 204, the exemplary method includes selecting at least one private network. Selecting the private network allows for choosing which network needs to be accessed by the user device. The private network may be any kind of appropriate network for data transfer, including, for example, a CBRS network. The private network may additionally or alternatively be an on-premise network, meaning that the private network is accessible by a user device only when the user device is within a distance of a point of relevance, for example, near the facility associated with the network.

The exemplary method uses a configuration credential to permit the first responder to access the network. Requiring a configuration credential can prevent other parties from accessing private information on the private network. At step 206, the exemplary method includes provisioning the private network to accept a configuration credential. The configuration credential may include one or more of a Citizens Broadband Radio Service (CBRS) operating frequency band, an on-premises network operator international mobile subscriber identity (IMSI), a temporary mobile subscriber identity (TMSI), an authentication key, a closed subscriber group (CSG) information, access point name (APN) information, and a location area identity (LAI). Different configuration credentials may be used for different networks or different user devices.

At step 208, the exemplary method includes sending the configuration credential to the user device. The configuration credential can be sent to the user device through a communications network. As the user device may already be configured to communicate with the communications network, the exemplary method allows for remotely granting the user device access to one or more private networks. That is, the exemplary methods allow for configuration by using one network to provide a user device with access to another network. The configuration credential may operate to provision an electronic subscriber identification module (SIM) in the user device to access the private network.

Once connected to the private network, the user may desire to view information accessible through the private network. The private network may have read and write access to a database of facility information. Once the user device has access to the private network, it may be useful to read from the database of facility information to view, for example, security footage. Accordingly, at step 210, the exemplary method includes reading from the database of facility information. The database of facility information may include one or more of a smoke information, a gas information, a map information, a security footage, a temperature information, a light control information, an elevator access information, and a door access information. The information may be static or may be updated in real-time.

It may also be desirable to alert users of the private network about the emergency. For example, it may be useful in an emergency to inform tenants of a facility not to go to a certain floor or to remain in or evacuate their respective units. At step 212, the exemplary method includes providing an alert through the private network. Not all users of the network may need to receive the alert. Accordingly, the alert may be targeted to only some of a plurality of devices communicatively coupled to the first private network. The exemplary method includes ending at step 214.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or device that comprises, has, includes, contains a list of elements does not include only those elements but may include other elements not expressly listed or inherent to such process, method, article, or device. An element proceeded by "comprises . . . a," "has . . . a," "includes . . . a", "contains . . . a" does not, without more constraints, preclude the existence of additional identical elements in the process, method, article, or device that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or device described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A public safety system configured to:
communicate with a plurality of private networks and a communications network, each of the plurality of private networks corresponding to a respective one of a plurality of facilities;
receive an emergency notification identifying a first facility of the plurality of facilities as experiencing an emergency; and
in response to receiving the emergency notification:
select a first private network of the plurality of private networks, the first private network corresponding to the first facility, the first private network associated with the emergency;
provision the first private network to accept a configuration credential; and
send through the communications network the configuration credential to a user device of a first responder, thereby provisioning a subscriber identification module (SIM) in the user device of the first responder to access the first private network.

2. The public safety system of claim 1, wherein the configuration credential comprises at least one of a Citizens Broadband Radio Service (CBRS) operating frequency band identifier, an on-premises network operator international mobile subscriber identity (IMSI), a temporary mobile subscriber identity (TMSI), an authentication key, a closed subscriber group (CSG) information, an access point name (APN) information, and a location area identity (LAI).

3. The public safety system of claim 1, wherein the first private network is a CBRS network comprising a push-to-talk (PTT) service.

4. The public safety system of claim 1, wherein the first private network is an on-premise private network with internet access and read and write access to a database of facility information.

5. The public safety system of claim 4, wherein the database of facility information comprises at least one of the group selected from a smoke information, a gas information, a map information, a security footage, a temperature information, a light control information, an elevator access information, and a door access information.

6. The public safety system of claim 1, further configured to provide an alert, through the first private network and upon receiving the emergency notification, to one or more of a plurality of devices of respective users of the first private network that are communicatively coupled to the first private network.

7. The public safety system of claim 6, wherein the alert is targeted to only a subset of the plurality of devices communicatively coupled to the first private network, the subset being devices of respective users of the first private network who are tenants of the first facility.

8. A method for providing private network access to a user device of a first responder, the method comprising:
receiving an emergency notification identifying a first facility of a plurality of facilities as experiencing an emergency; and
in response to receiving the emergency notification:
selecting a first private network of a plurality of private networks, each of the plurality of private networks corresponding to a respective facility of the plurality of facilities, the first private network corresponding to the first facility, the first private network associated with the emergency;
provisioning the first private network to accept a configuration credential; and
sending, via a communications network, the configuration credential to the user device of the first responder, thereby provisioning a subscriber identification module (SIM) in the user device of the first responder to access the first private network.

9. The method of claim 8, wherein the configuration credential comprises at least one of a Citizens Broadband Radio Service (CBRS) operating frequency band, an on-premises network operator international mobile subscriber identity (IMSI), a temporary mobile subscriber identity (TMSI), an authentication key, a closed subscriber group (CSG) information, an access point name (APN) information, and a location area identity (LAI).

10. The method of claim 8, wherein the first private network is a CBRS network.

11. The method of claim 8, wherein:
the first private network provides internet access;
the first private network is an on-premise private network at the first facility with read and write access to a database of facility information for the first facility; and
the method comprises reading, by the user device of the first responder, from the database of facility information.

12. The method of claim 11, wherein the database of facility information comprises at least one of the group selected from a smoke information, a gas information, a map information, a security footage, a temperature information, a light control information, an elevator access information, and a door access information.

13. The method of claim 11, wherein the internet access allows the user device of the first responder to access to a push-to-talk (PTT) service.

14. The method of claim 8, further comprising providing an alert, through the first private network after receiving the emergency notification, to one or more of a plurality of devices of respective users of the first private network that are communicatively coupled to the first private network.

15. The method of claim 14, wherein the alert is targeted to only a subset of the plurality of devices communicatively coupled to the first private network, the subset being devices of respective users of the first private network who are tenants of the first facility.

* * * * *